(12) United States Patent
Kozma et al.

(10) Patent No.: US 6,894,625 B1
(45) Date of Patent: May 17, 2005

(54) SERVICE VEHICLE ATTACHMENT WARNING APPARATUS

(76) Inventors: Timothy Grant Kozma, 1950 Stone St., Savannah, GA (US) 31410; Joseph B. Justice, 117 Michael St., Bloomingdale, GA (US) 31302

(*) Notice: Subject to any disclaimer, the term of this patent is extended or adjusted under 35 U.S.C. 154(b) by 0 days.

(21) Appl. No.: 10/604,990

(22) Filed: Aug. 29, 2003

(51) Int. Cl.[7] .................................................. G08G 5/00
(52) U.S. Cl. ..................... 340/950; 340/958; 340/668.1; 340/687; 340/431; 280/420; 280/422; 280/638
(58) Field of Search ................................ 340/950, 958, 340/687, 686.1, 431; 280/420, 422, 638, 446.1, 838, 839; 701/29, 35; 244/1 R

(56) References Cited

U.S. PATENT DOCUMENTS

| | | | | |
|---|---|---|---|---|
| 4,113,041 A | * | 9/1978 | Birkeholm | .................. 180/14.1 |
| 5,253,891 A | * | 10/1993 | Carlin et al. | ................. 280/422 |
| 6,424,891 B1 | * | 7/2002 | Sargent et al. | ................. 701/29 |
| 2004/0011918 A1 | * | 1/2004 | Musial et al. | |

* cited by examiner

*Primary Examiner*—Hung Nguyen
(74) *Attorney, Agent, or Firm*—Rigdon Patents & Engineering, P.C.; Jonathan R. Smith

(57) ABSTRACT

An aircraft ground power unit (GPU) is equipped with a device that warns personnel with a flashing light and a siren when the unsafe condition exists of the GPU being connected to both the tug and the aircraft at the same time. Similar devices can be used on other towed vehicles that can cause damage to vehicles or structures if towed away while still attached to the vehicle or structure.

14 Claims, 8 Drawing Sheets

SERVICE VEHICLE ATTACHMENT WARNING APPARATUS

BACKGROUND OF INVENTION

There are certain apparatuses in use today which require temporary connection to service vehicles. For example, many vehicles require temporary connection to a fuel re-supply truck, and some fixed structures require either that or temporary connection to a battery recharging vehicle. Most large aircraft require temporary connection to ground power units (GPUs) which are typically mounted on a trailer towed by a "tug" and which supply electric power to an aircraft before its engines are started. Many turbine-powered aircraft further require temporary connection to an "airstart" unit to spin the engines prior to ignition. A problem with such temporary attachments is that there exists the potential for the service vehicle inadvertently to be driven away from the apparatus being serviced before detachment from the apparatus being serviced, almost certainly causing damage to the apparatus and/or the vehicle, and in addition possibly injuring personnel. Many incidents have been logged of aircraft GPUs or airstart trailers being driven off while the CPU umbilical is still attached to aircraft, causing, at a minimum, damage to the receptacle on the aircraft. Not only is such damage costly to repair, but also admits the possibility of exacerbated or even catastrophic damage to the aircraft in flight.

The system currently in use to prevent such incidents; involving CPU connections to aircraft consists simply of detaching the CPU towbar from the tug while the CPU is attached to the aircraft, raising the towbar to a vertical position, and placing a safety-yellow "sock" over it to signify to personnel that the CPU is attached to the aircraft. Procedures require that the sock not be removed from the towbar until the CPU is disconnected from the aircraft. The weakness in this procedure is that if someone should fail to follow it, the towbar can, and therefore inevitably sometimes will, be reattached to the tug and the tug driven away without the umbilical having been first detached from the aircraft.

It would be possible to arrange a safety interlock that would interconnect the ignition switch on the tug with the umbilical plug and receptacle combination on the aircraft. In other words, a sensor, such as a switch embedded in the CPU plug, could be electrically arranged from the plug to the CPU and thence from the GPU towbar to the tug, to keep the tug starter circuit open as long as the plug was in the receptacle. The main drawback here is expense of making, installing, and maintaining the interlock system itself on the GPUs and the tugs. Also, if it is relied upon, a failure in it would practically guarantee an occasional damage incident. As in all critical service routines where human life is at stake, it is important to assure that, as a final step in preparation for aircraft flight, human beings are alerted to hazards and allowed to take corrective action. This is why the preflight walkaround has been the capstone of aviation safety since the beginning of flight. An uncomplicated, and therefore inexpensive and reliable, system to warn personnel of an unsafe condition involving service vehicles is needed.

SUMMARY OF INVENTION

The present invention is an electrical warning system mounted on a service vehicle, in this case an aircraft ground power unit (GPU). The system consists of two electrical switches, normally closed, connected in series with the existing GPU battery power source and a combined strobe light and horn. One of the switches is mounted near or on the GPU towbar so that it is closed unless the towbar is in its raised position. The other switch is mounted in a holster specially shaped to hold the GPU plug. This second switch is closed unless held open by the presence of the plug in the holster. If both the towbar is down and the plug is not in the holster, both switches are closed and the light flashes and the horn sounds, alerting personnel that conditions are right for aircraft damage. If the plug is in the aircraft, personnel can only prevent the alarm from sounding by raising the towbar, thereby making it impossible to tow the GPU away from the aircraft. Similarly, if the towbar is attached to the tug, personnel can only prevent the alarm from sounding by unplugging the GPU from the aircraft.

An object of this invention is to provide warning to personnel of the potential for damaging an aircraft by towing a service vehicle away from it while the service vehicle's umbilical is still attached.

Yet another object of this invention is to provide a warning system attached to only one vehicle (a towed service vehicle).

Still other objects of this invention are to provide a warning system that is highly reliable, inexpensive to build into existing service vehicles or to retrofit to existing service vehicles, and inexpensive to maintain.

DETAILED DESCRIPTION

Figure 1:
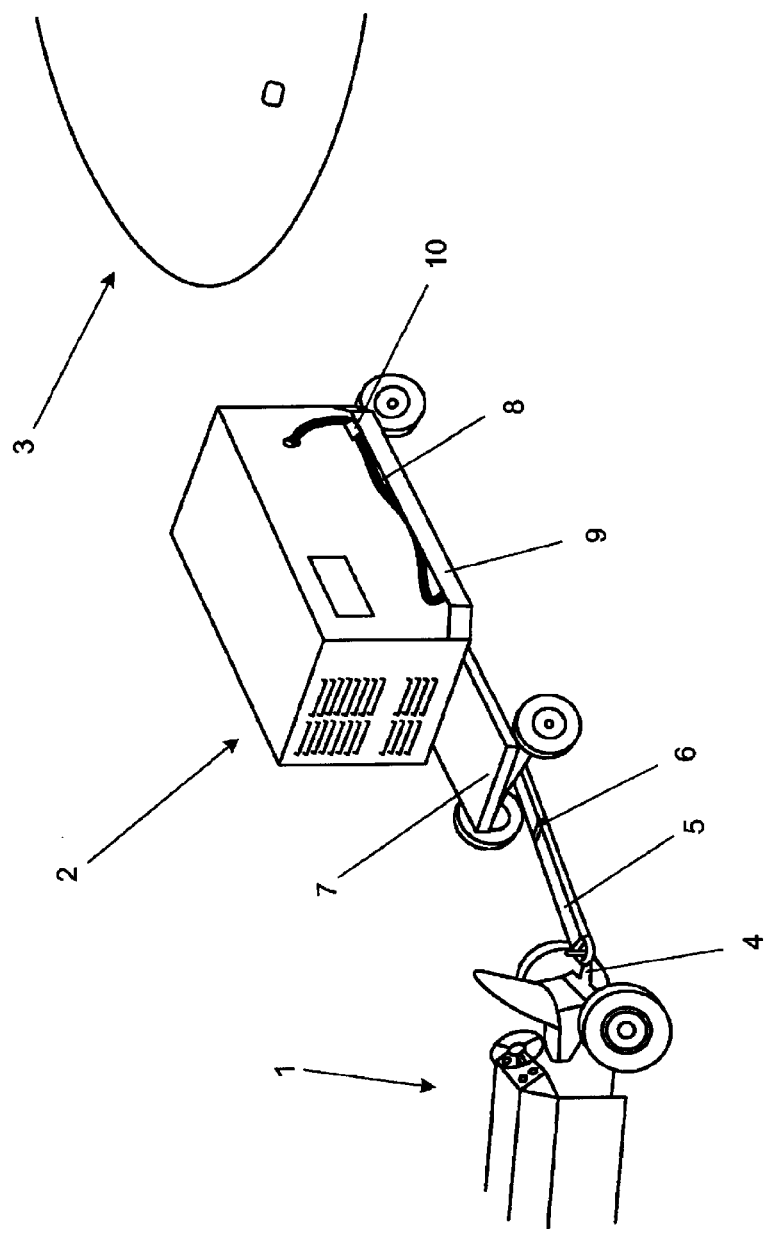
FIG. 1 is a perspective view of the prior art arrangement of a tug, a CPU, and an aircraft prior to connection of the CPU to the aircraft.

Now referring to the drawings, in which like reference numerals in all the drawings refer to like features in each of the drawings, FIG. 1 is a perspective view of the prior art arrangement of a tug 1, a GPU 2, and an aircraft 3; prior to connection of the GPU to the aircraft. The tug has a hitch 4 to which a towbar 5 may be removably attached, the towbar being attached by hinge 6 in a horizontal position to the front end 7 of the GPU. A service umbilical 8 containing electric wires lies in a tray 9 along one side of the GPU. The service umbilical terminates in a plug 10 for connection to the aircraft.

Figure 2:
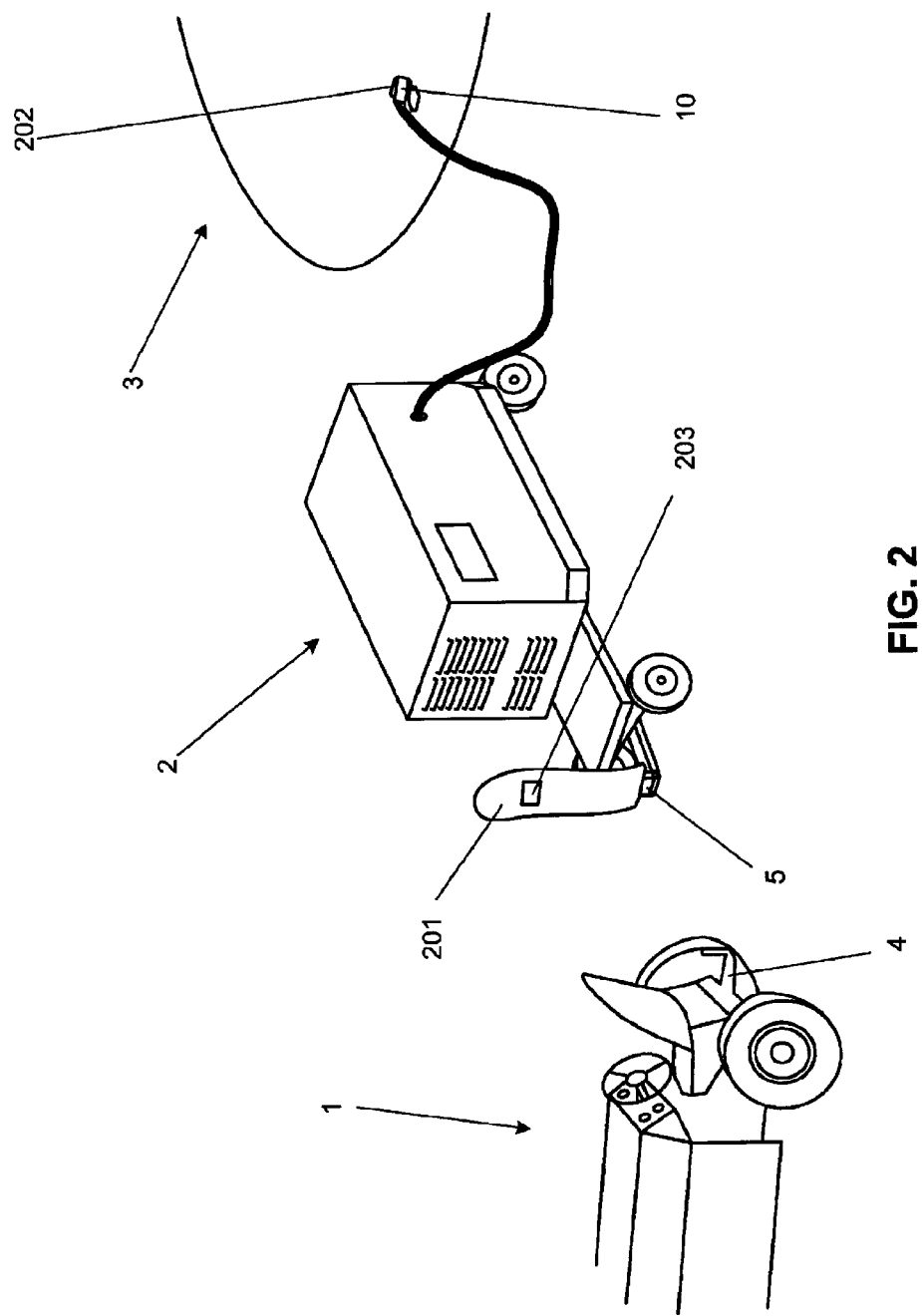
FIG. 2 is a perspective view of the prior art arrangement of a CPU connected to and providing power to an aircraft.

FIG. 2 is a perspective view of the prior art arrangement of GPU 2 connected to and providing power to aircraft 3. GPU towbar 5 is disconnected from hitch 4 and raised to the vertical. Placement of a safety-yellow sock 201 over towbar 5 constitutes a signal to personnel that the umbilical plug 10 may be inserted into GPU receptacle 202 on aircraft 3. Note that since the sock must be removed from the towbar at some point in the process anyway, its removal per se does not positively warn a person who removes it and reattaches the towbar to the tug that he or she has created the potential for a drive-off incident.

Figure 3:
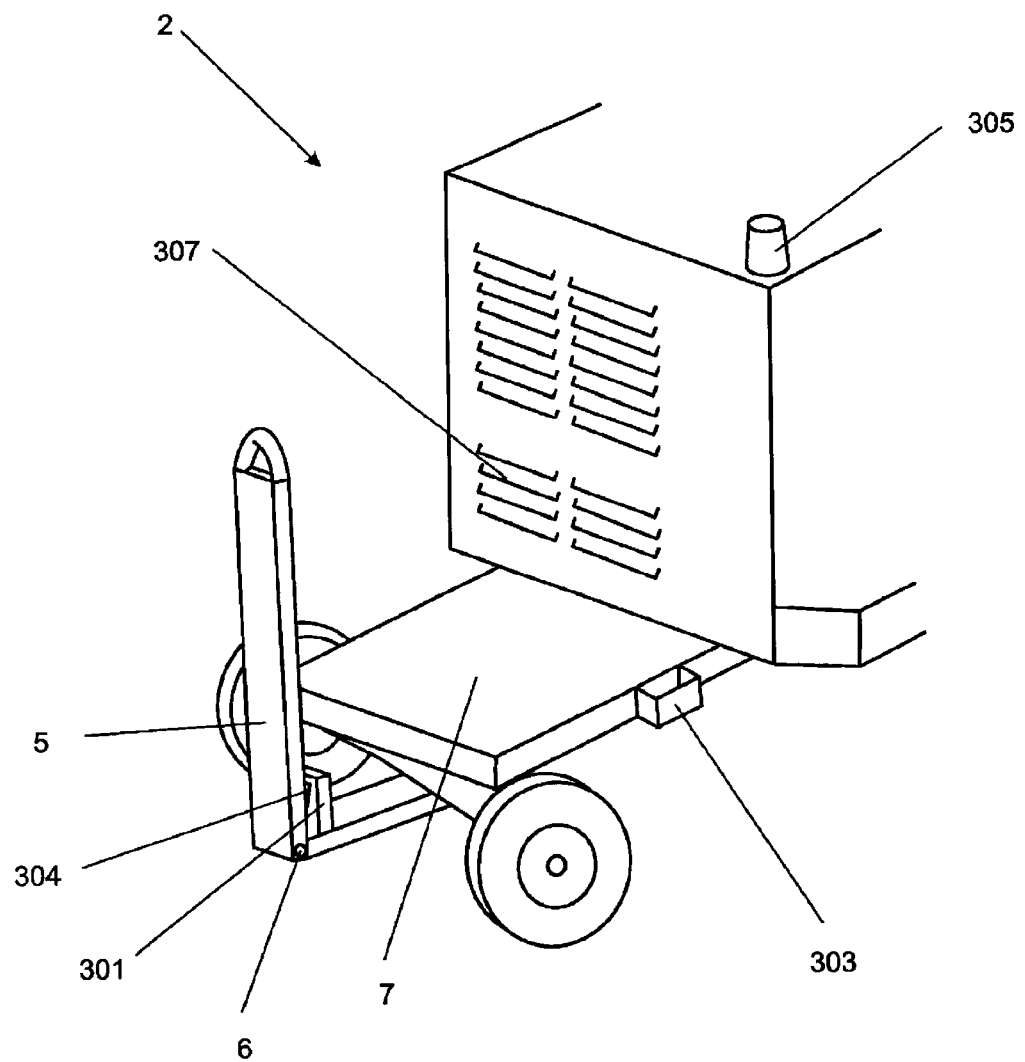
FIG. 3 is a perspective view of a CPU with the present invention installed.

FIG. 3 is a perspective view of a CPU 2 with the present invention installed. A momentary-open, normally-closed towbar switch 301 is provided near the hinge 6 connecting towbar 5 to the front end of the CPU 2. A holster 303 is attached to one side of the front end 7 of the CPU. When the towbar is fully raised, key 304 is pressed by the towbar, opening the switch 301. A strobe light 305 is affixed to the top of the CPU and a horn 306 (not visible) is installed behind grille 307 on the CPU.

Figure 4:
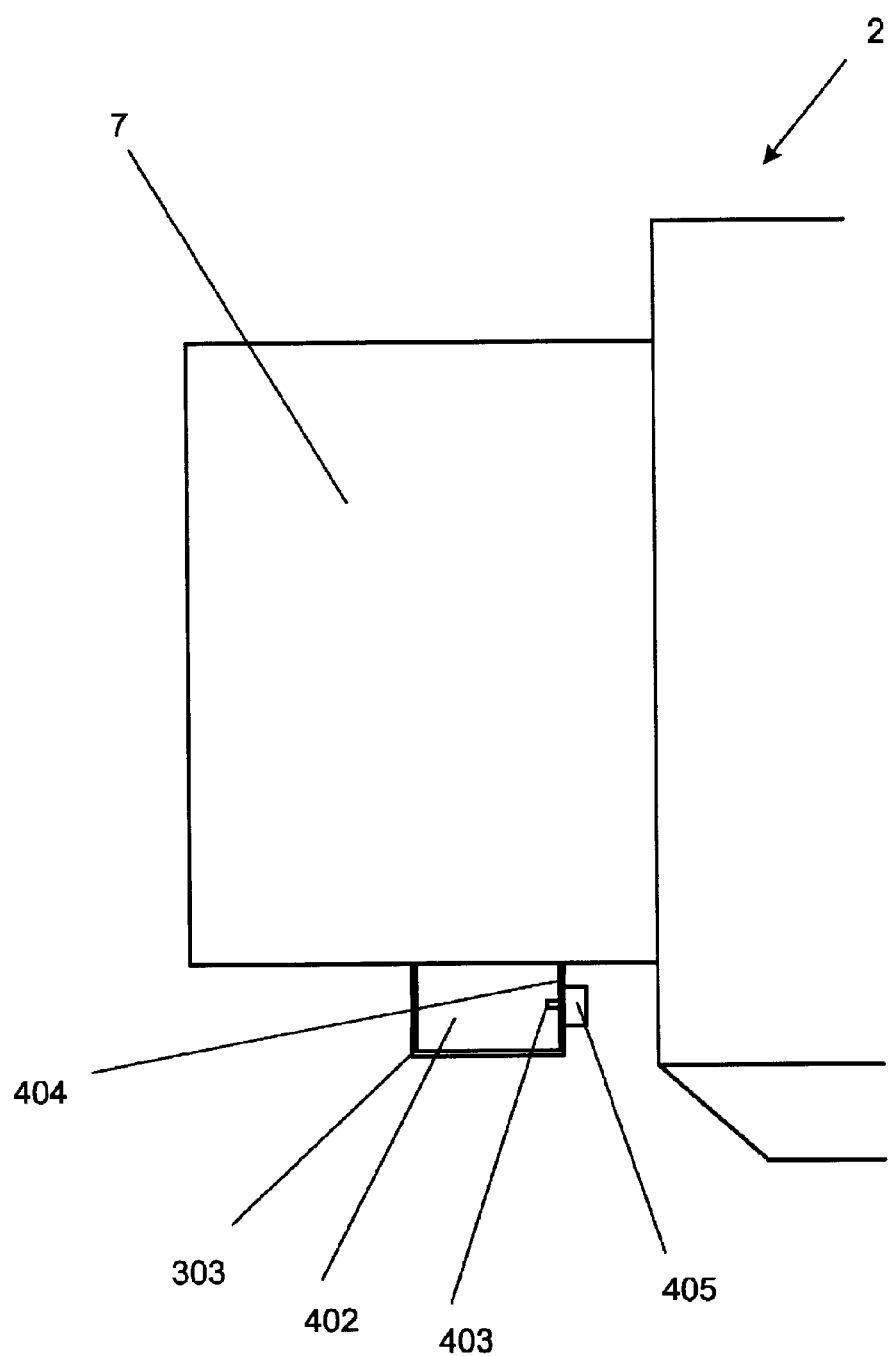
FIG. 4 is a top view of the front end of the CPU.

FIG. 4 is a top view of the front end 7 of CPU 2, more closely showing the holster 303 for plug 10 (not shown here but shown in FIGS. 1 and 2). Note that in the cavity 402 of the holster there is a smooth lever 403 which projects through one of the inner faces 404 of the cavity 402. The smooth lever 403 can be pressed toward face 404, thereby opening a second momentary-open, normally-closed plug switch 405, as would happen when a CPU umbilical plug (not shown here) is placed in it.

Figure 5:
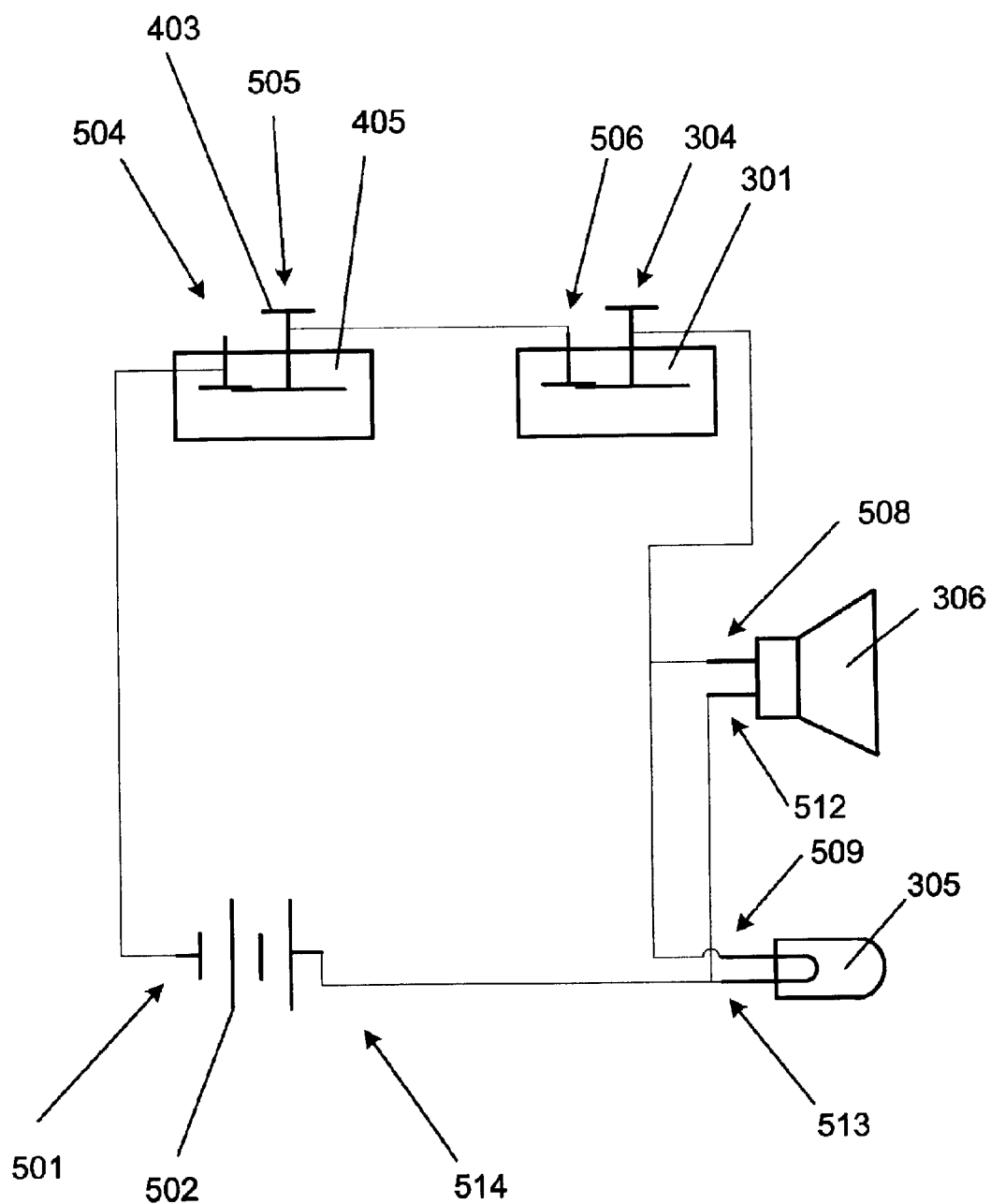
FIG. 5 is a circuit diagram of the present invention.

FIG. 5 is a circuit diagram of the present invention. The positive pole 501 of the CPU onboard battery 502 is connected by a wire to the normally-closed terminal 504 of plug switch 405. The common, or in this case, negative, terminal 505 of the plug switch 405 is in turn connected to the normally-closed terminal 506 on the towbar switch 301. The towbar switch common 507 is connected to the positive terminals 508 and 509, respectively, of horn 306 and strobe light 305. The negative terminals 512 and 513, respectively, of horn 306 and strobe light 305, are connected to the negative battery terminal 514.

Plug switch 405, being normally-closed, is opened by pressure on lever 403 by the GPU umbilical plug (not shown here). Similarly, towbar switch 301, being normally-closed, is opened by pressure on key 304 by the GPU towbar (not shown).

Figure 6:
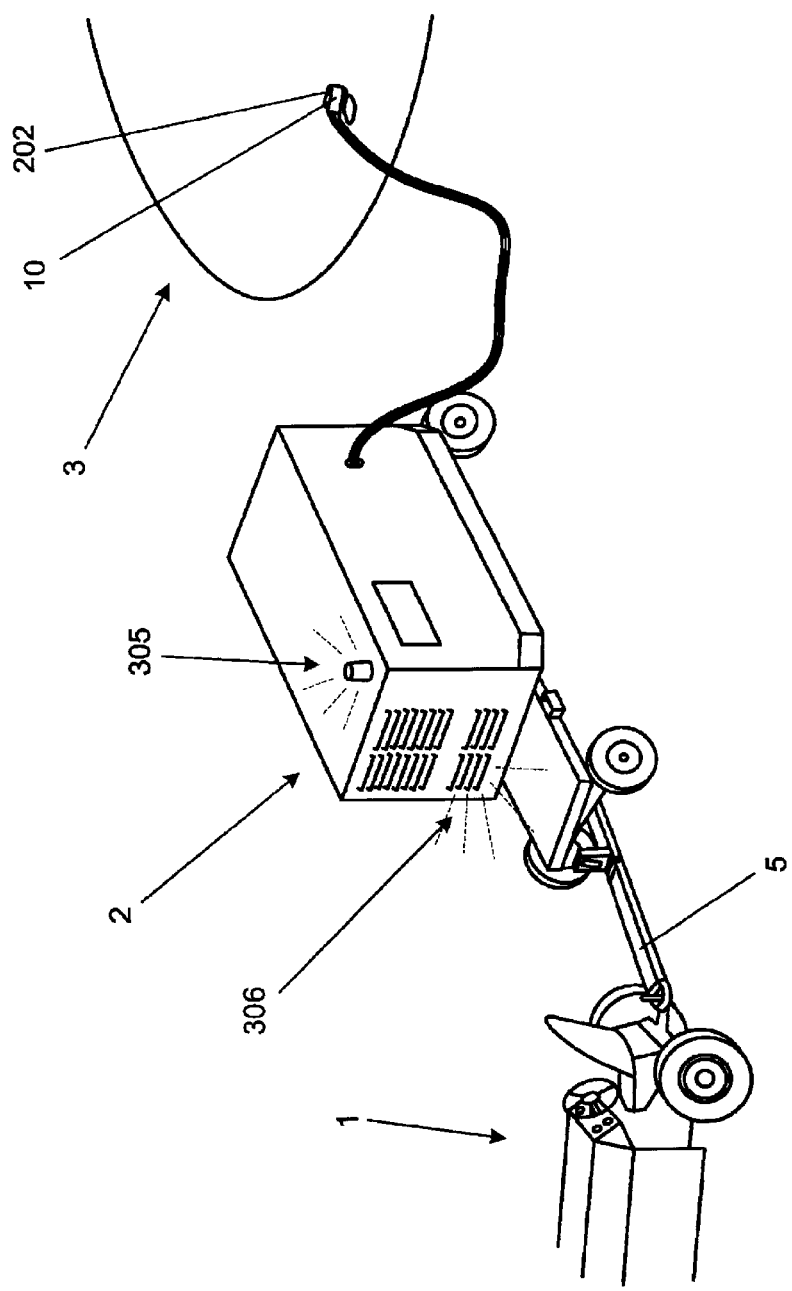
FIG. 6 is a perspective view of a CPU connected both to an aircraft and a tug, with the alarm system of this invention in activation.

FIG. 6 is a perspective view of a GPU connected both to aircraft 23 and tug 1, with the alarm system of this invention in activation. Note that towbar 5 is down (connected to tug 1) and plug 10 is connected to GPU receptacle 202 in aircraft 3. Horn 306 is sounding and strobe light 305 is flashing.

Figure 7:
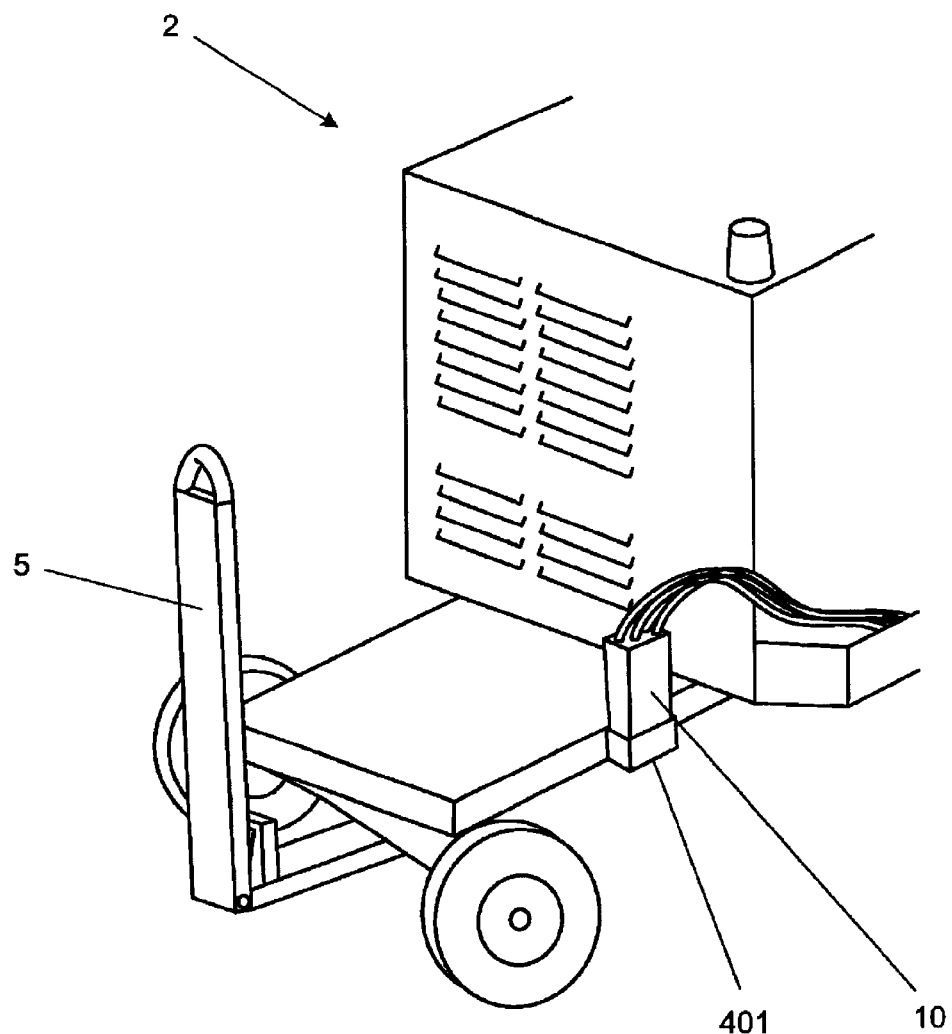
FIG. 7 is a perspective view of a CPU equipped with the present invention and the alarm function deactivated by removal of the plug from the aircraft.

FIG. 7 is a perspective view of a GPU equipped with the present invention and the alarm function deactivated by removal of the plug 10 from the aircraft 3 (not shown) and placement in holster 303. Deactivation is also effected by raising towbar 5.

Figure 8:
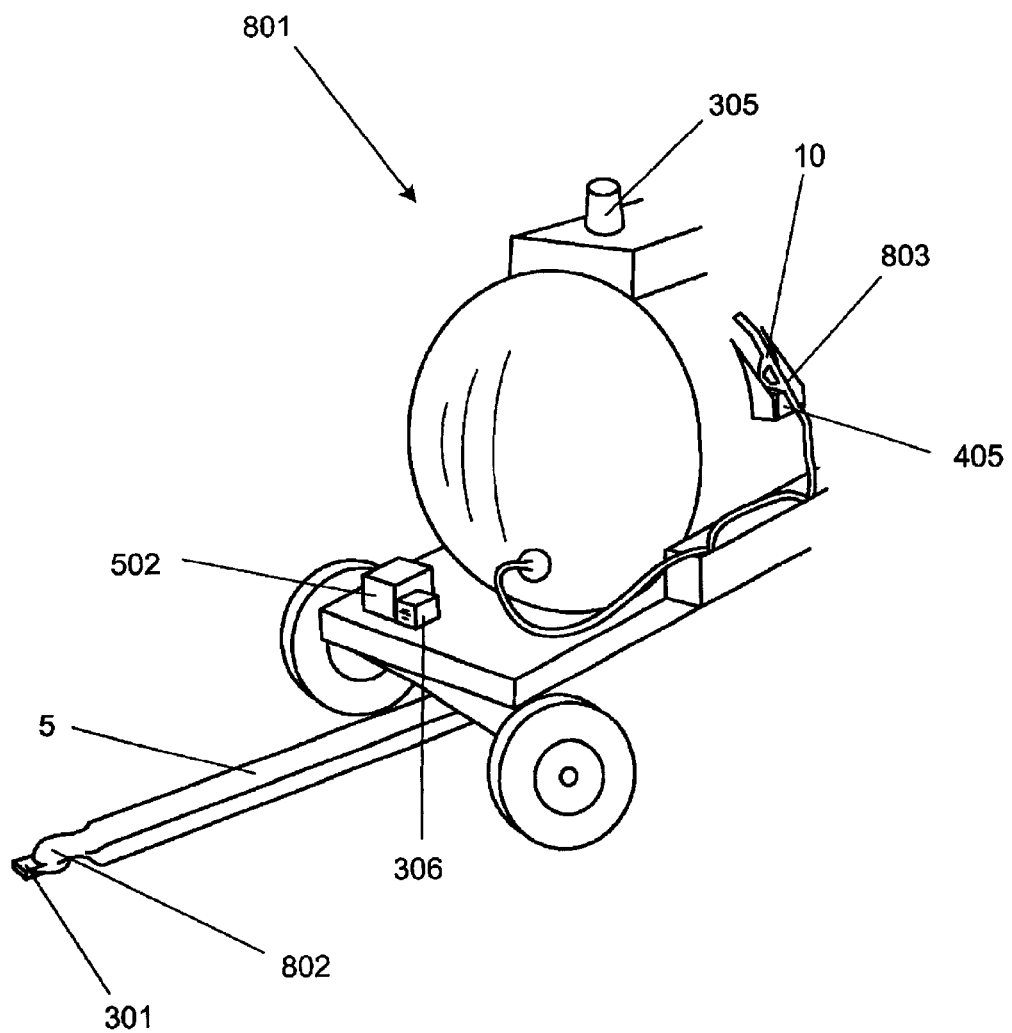
FIG. 8 is a perspective view of a fuel trailer equipped with the present invention.

This invention has applicability to other service vehicles, particularly trailers towed by a tractor vehicle which are intended for temporarily connection to another vehicle or structure. FIG. 8 shows one example, a fuel trailer 801 equipped with the invention. This trailer has a towbar 5 that is fixed in a horizontal position and can only be raised enough to place over a hitch ball (not shown) on a tractor (not shown). A normally-open towbar switch 301, mounted on the front of ball socket 802 on trailer towbar 5, closes when the socket 802 is lowered onto, and comes into contact with, a ball hitch. The nozzle receptacle 803 on the side of the trailer 801 has a normally-closed nozzle switch 405 within it which is opened by insertion of the fuel filler nozzle 10. Light 305 and horn 306 are powered by and on-board battery 502.

What is claimed is:

1. On a service vehicle having a means for attaching to a towing vehicle and a means for attaching to an article, an attachment warning apparatus, comprising:

a source of electric power;

an alarm;

means for detecting attachment of the service vehicle to the towing vehicle;

means for detecting attachment of the service vehicle to the article; and means for actuating the alarm when both the towing vehicle detection means detects a towing vehicle and the article detection means detects an article.

2. The attachment warning apparatus of claim 1, wherein:

said towing vehicle detection means further comprises a first switch mounted on said towing vehicle attachment means;

said article detection means comprises a second switch mounted on a receiver for said article attachment means, the receiver being mounted on said service vehicle; and said means for actuating said alarm comprises an electric circuit containing said source of electric power connected in series with said alarm, the first switch, and the second switch.

3. The attachment warning apparatus of claim 2, wherein:

said first switch is normally closed and is opened when said towing vehicle attachment means is detached from said towing vehicle;

said second switch is normally closed and is opened when said article attachment means is attached to said receiver.

4. The attachment warning apparatus of claim 3, wherein:

said service vehicle is an aircraft ground power unit;

said article is an aircraft;

said towing vehicle attachment means is a towbar, the towbar being in a first position when attached to said towing vehicle and in a second position when not attached to said towing vehicle, said first switch being opened by the towbar in the second position;

said article attachment means is a ground power unit plug; and said receiver is a holster shaped to accept the plug and having said second switch affixed thereto so that said second switch is opened by the plug inserted into the holster.

5. The attachment warning apparatus of claim 4, wherein:

said alarm is an electric light and an electric horn connected in parallel to each other.

6. The attachment warning apparatus of claim 5, wherein:

said electric light is a strobe light.

7. On an aircraft ground power unit having a towbar; a battery, an umbilical cord, and an aircraft attachment plug on the end of the umbilical cord, an apparatus for alarming the simultaneous connection of the towbar to a towing vehicle and the plug to an aircraft, comprising;

a first switch affixed to the ground power unit in an orientation that opens the switch when the towbar is not connected to the towing vehicle;

a holster affixed to the ground power unit, the holster having a cavity, the cavity having internal walls and shaped to hold the plug when it is not attached to the aircraft;

a second switch affixed to the holster through one of the internal walls in an orientation that opens the second switch when the plug is inserted into the cavity; and an alarm wired in series with the battery, the first switch, and the second switch, the alarm consisting of either:

a) a light,
b) a horn, or
c) both a light and a horn.

8. A service vehicle capable of being towed, comprising:
means for attachment to a towing vehicle;
means for attachment to an article being serviced;
a source of electric power;
an alarm;
means for detecting attachment of the service vehicle to the towing vehicle;
means for detecting attachment of the service vehicle to the article; and
means for actuating the alarm when both the towing vehicle detection means detects a towing vehicle and the article detection means detects an article.

9. The service vehicle of claim 8, wherein:
said towing vehicle detection means further comprises a first switch mounted on said towing vehicle attachment means;
said article detection means comprises a second switch mounted on a receiver for said article attachment means, the receiver being mounted on the service vehicle; and
said means for actuating said alarm comprises an electric circuit containing said source of electric power connected in series with said alarm, the first switch, and the second switch.

10. The service vehicle of claim 9, wherein:
said first switch is normally closed and is opened when said towing vehicle attachment means is detached from said towing vehicle;
said second switch is normally closed and is opened when said article attachment means is attached to said receiver.

11. The service vehicle of claim 10, wherein:
the service vehicle is an aircraft ground power unit;
said article is an aircraft;
said towing vehicle attachment means is a towbar, the towbar being in a horizontal position when attached to said towing vehicle and in a vertical position when not attached to said towing vehicle, said first switch being opened by the towbar in the vertical position;
said article attachment means is a ground power unit plug; and
said receiver is a holster shaped to accept the plug and having said second switch affixed thereto so that said second switch is opened by the plug inserted into the holster.

12. The service vehicle of claim 11, wherein:
said alarm is an electric light and an electric horn connected in parallel.

13. The service vehicle of claim 12, wherein:
said electric light is a strobe light.

14. An aircraft ground power unit capable of being towed by a towing vehicle, the ground power unit having a towbar;
a battery, an umbilical cord, and an aircraft attachment plug on the end of the umbilical cord, the ground power unit further comprising;
a first switch affixed to the ground power unit in an orientation that opens the switch when the towbar is not connected to the towing vehicle;
a holster affixed to the ground power unit, the holster having a cavity, the cavity having internal walls and shaped to hold the plug when it is not attached to the aircraft;
a second switch affixed to the holster through one of the internal walls in an orientation that opens the second switch when the plug is inserted into the cavity; and
an alarm wired in series with the battery, the first switch, and the second switch, the alarm consisting of either:
a) a light,
b) a horn, or
c) both a light and a horn.

* * * * *